(12) United States Patent
Etter et al.

(10) Patent No.: US 9,351,603 B2
(45) Date of Patent: May 31, 2016

(54) ASSEMBLY OF FLOWMETER TO PCB IN A BEVERAGE MACHINE

(75) Inventors: Stefan Etter, Kehrsatz (CH); Martin Ziegler, Koniz (CH)

(73) Assignee: Nestec S.A., Vevey (CH)

( * ) Notice: Subject to any disclaimer, the term of this patent is extended or adjusted under 35 U.S.C. 154(b) by 742 days.

(21) Appl. No.: 13/513,112

(22) PCT Filed: Nov. 26, 2010

(86) PCT No.: PCT/EP2010/068293
§ 371 (c)(1),
(2), (4) Date: May 31, 2012

(87) PCT Pub. No.: WO2011/067181
PCT Pub. Date: Jun. 9, 2011

(65) Prior Publication Data
US 2012/0234181 A1    Sep. 20, 2012

(30) Foreign Application Priority Data

Dec. 1, 2009 (EP) .................................... 09177591

(51) Int. Cl.
| | |
|---|---|
| A23L 1/00 | (2006.01) |
| B67D 1/00 | (2006.01) |
| G01F 15/14 | (2006.01) |
| A47J 31/44 | (2006.01) |

(Continued)

(52) U.S. Cl.
CPC *A47J 31/44* (2013.01); *A47J 31/46* (2013.01); *G01F 1/06* (2013.01); *G01F 1/075* (2013.01); *G01F 15/14* (2013.01); *G01F 15/185* (2013.01)

(58) Field of Classification Search
CPC ........... A47J 31/44; A47J 31/46; G01F 15/14; G01F 15/185; G01F 1/06; G01F 1/075
USPC ................................................ 99/275; 73/273
See application file for complete search history.

(56) References Cited

U.S. PATENT DOCUMENTS

| | | | |
|---|---|---|---|
| 7,913,577 B2 | 3/2011 | Tanaka et al. | |
| 2007/0107604 A1* | 5/2007 | Wei ................................ | 99/279 |

FOREIGN PATENT DOCUMENTS

| | | |
|---|---|---|
| DE | 102008006263 | 7/2009 |
| EP | 0841547 | 5/1998 |

(Continued)

OTHER PUBLICATIONS

Written Opinion and International Search Report mailed Apr. 2, 2011 for corresponding Intl. Appln. No. PCT/EP10/068293.

(Continued)

*Primary Examiner* — Dana Ross
*Assistant Examiner* — Lindsey C Teaters
(74) *Attorney, Agent, or Firm* — K&L Gates LLP

(57) ABSTRACT

A flowmeter (1) comprises: an outermost casing (2,4) containing a measuring chamber (10); an outermost face (20) on the casing; a generator (3,36) for generating at the outermost face a signal representative of a flow through the measuring chamber; and a connection arrangement (28) for fastening the outermost casing against a PCB (50) which extends over and beyond the outermost casing and contains a sensor (51) that is located at the outermost face and that is configured to sense the signal from the generator upon connection. The connection arrangement is configured for connection against the PCB, which connection between the PCB and the casing is distinct from the sensor.

19 Claims, 1 Drawing Sheet

(51) Int. Cl.
*A47J 31/46* (2006.01)
*G01F 1/06* (2006.01)
*G01F 1/075* (2006.01)
*G01F 15/18* (2006.01)

(56) References Cited

FOREIGN PATENT DOCUMENTS

| EP | 1693651 | 8/2006 |
|----|---------|--------|
| FR | 2538103 | 6/1984 |
| GB | 2382661 | 6/2003 |
| JP | 58155209 | 9/1983 |
| JP | 07131894 | 5/1995 |
| JP | 2006273202 | 10/2006 |
| WO | 2009/043851 A2 | 4/2009 |
| WO | 2009/043865 A2 | 4/2009 |
| WO | 2009/074550 A2 | 6/2009 |
| WO | 2009/130099 | 10/2009 |

OTHER PUBLICATIONS

Office Action issued in JP Application 2012541421 mailed Dec. 12, 2014. 8 pages.

* cited by examiner

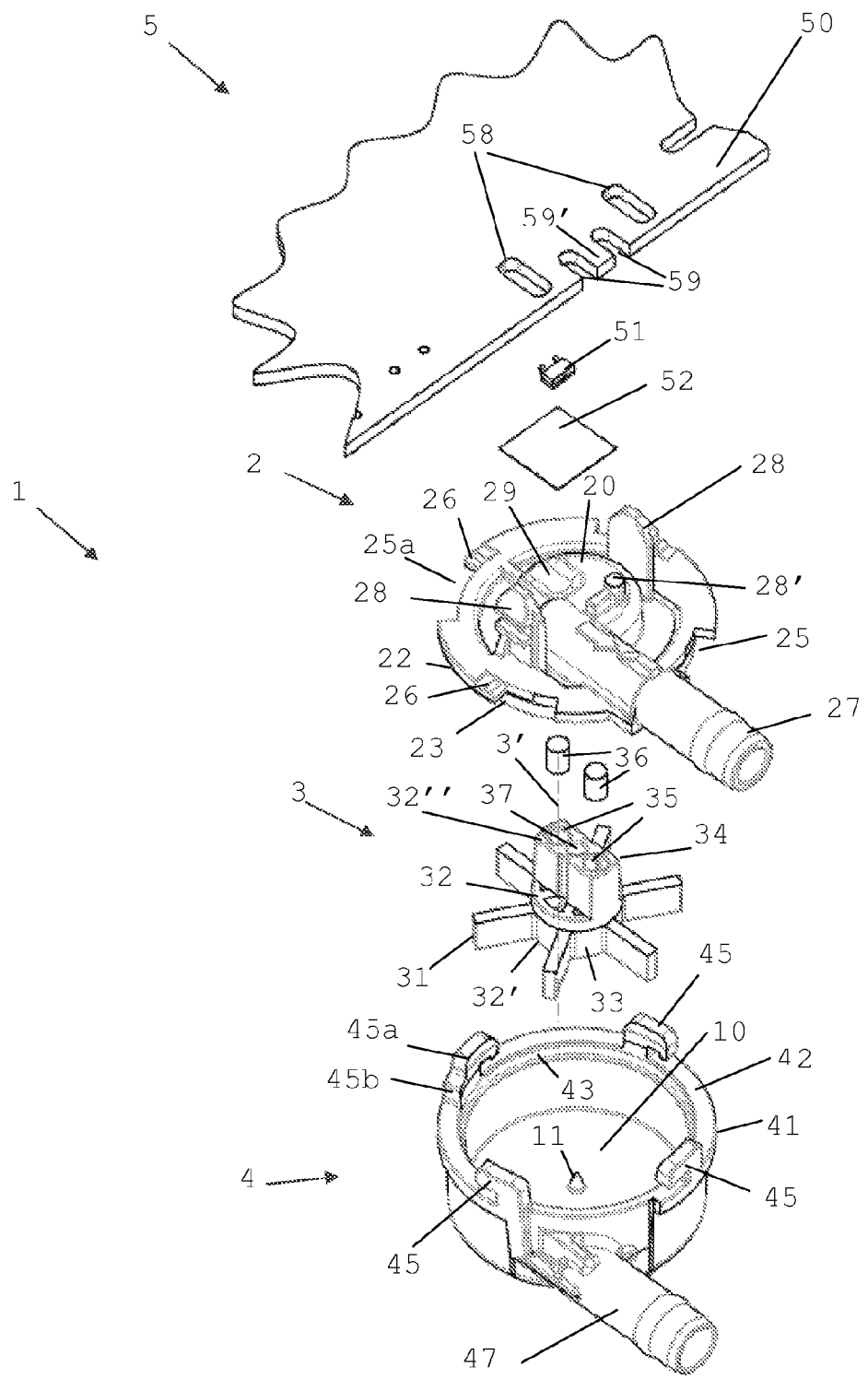

ASSEMBLY OF FLOWMETER TO PCB IN A BEVERAGE MACHINE

CROSS REFERENCE TO RELATED APPLICATIONS

The present application is a National Stage of International Application No. PCT/EP2010/068293, filed on Nov. 26, 2010, which claims priority to European Patent Application No. 09177591.6, filed on Dec. 1, 2009, the entire contents of which are being incorporated herein by reference.

FIELD OF THE INVENTION

The field of the invention pertains to the assembly of a flowmeter to a PCB, in particular in a beverage preparation machine.

For the purpose of the present description, a "beverage" is meant to include any liquid food, such as tea, coffee, hot or cold chocolate, milk, soup, baby food, etc. . . .

BACKGROUND ART

Certain beverage preparation machines use capsules containing ingredients to be extracted or to be dissolved; for other machines, the ingredients are stored and dosed automatically in the machine or else are added at the time of preparation of the drink.

Various beverage machines, such as coffee machines, are arranged to circulate liquid, usually water, from a water source that is cold or heated by heating means, to a mixing or infusion chamber where the beverage is actually prepared by exposing the circulating liquid to a bulk or pre-packaged ingredient, for instance within a capsule. From this chamber, the prepared beverage is usually guided to a beverage dispensing area, for instance to a beverage outlet located above a cup or mug support area comprised or associated with the beverage machine. During or after the preparation process, used ingredients and/or their packaging is evacuated to a collection receptacle.

Most coffee machines possess filling means that include a pump for liquid, usually water, which pumps the liquid from a source of water that is cold or indeed heated through heating means, such as a heating resistor, a thermoblock or the like. For instance, U.S. Pat. No. 5,943,472 discloses a water circulation system for such a machine between a water reservoir and a hot water or vapour distribution chamber, for an espresso machine. The circulation system includes valves, a metallic heating tube and a pump that are interconnected with each other and with the reservoir via a plurality of silicone hoses that are joined together by clamping collars. 2009/043865, WO 2009/074550, WO 2009/130099 and PCT/EP09/058562 disclose further filling means and related details of beverage preparation machines.

To control the characteristics of the liquid circulated to the mixing or infusion chamber, e.g. quantity and/or speed, such machines typically include a flowmeter. The flowmeters used in such beverage machines are made of food safe materials at least where exposed to the circulating fluid and have to be economically affordable to be used in such machines.

U.S. Pat. No. 4,666,061 discloses a flowmeter for beverage dispenser lines for wine, mineral water or beer that can be easily disassembled and reassembled for cleaning. The flowmeter has a two-part housing assembled by a bayonet connector and enclosing a measuring chamber. The chamber contains a centred rotatable measuring body having a rotatable shaft held in pace by a pair of facing diamond point bearings mounted into the housing and extending into the chamber. A drawback of this device lies in the price of the diamond point bearings and the required assembly steps for mounting such point bearings into the housing of the flowmeter.

EP 0 841 547 discloses a flowmeter commercialised by DIGMESA which is suitable for beverage preparation machines. This flowmeter has a two-part housing with a bayonet connection having four assembly hooks symmetrically distributed on the periphery of the housing so as to allow four assembly positions of the two housing parts and thus four corresponding positions of the flowmeter's water inlet and outlet located on the two housing parts. The housing contains an inner measuring chamber with a central fixed shaft extending therethrough for mounting an inner rotatable measuring body with fins that are located in the flow path and that are driven thereby. The flow of liquid passing through the measuring chamber is derived from a measure of the speed of rotation of the rotatable measuring body using a Hall sensor. A drawback of this device lies in the large friction surface between the fixed shaft and the rotating measuring body which changes depending on the orientation of the flowmeter and which also affects the accuracy of the measure of the flow through the chamber. For some applications, a plurality of bayonet assembly hooks may be required. The number and size of assembly hooks may depend on the expected pressure under which the flowmeter may have to operate as well as on the assembly forces needed to secure imperviousness of the assembly. Hence, more than one or two assembly hooks may be required, as for example disclosed in the above EP 0 841 547. However, there are only very few situations in which a given flowmeter must be able to switch between different configurations. Most of the time a flowmeter takes one assembly configuration only during its lifetime. Therefore, the multitude of assembly positions can lead to unnecessary assembly mistakes since such flowmeters accept more assembly orientations than needed for their actual intended use.

WO 2009/043865 discloses a flowmeter rigidly fixed onto a PCB via a Hall sensor incorporated into the PCB as an integrated or discrete component. The rigid connection between the flowmeter and PCB via the Hall sensor facilitates automatic assembly. Indeed, with such a connection there is no need to handle loose or free flexible electric connection between the PCB and the flowmeter. WO 2009/043851 also mentions a cableless rigid connection between the flowmeter and a PCB for facilitating automatic assembly. In WO 2009/130099, the flowmeter can be rigidly mounted onto a PCB portion bearing a Hall sensor so that this sensor is assembled with its PCB portion to the flow meter. The PCB may in particular be enclosed in a housing with a through-opening through which the flow-meter extends from the PCB for connection within a fluid circuit extending outside the housing of the PCB.

GB 2 382 661 discloses a flowmeter for sensing fluid flow, comprising a sensor assembly adapted to be attached to a housing. The housing includes a rotatable impeller and is closed by a cap. The sensor assembly comprises a cover part having a chamber in which an electrical circuit board is located. A Hall Effect sensor is attached and coupled with the electronic circuit board. The electronic board comprises means for processing electrical signal received from the hall effect sensor and transmits a flow rate signal to a cable which is supposed to be connected to a control device or flow rate display.

A drawback of this device lies in the limited surface available inside the chamber, reducing drastically the possibilities to embed electronic components required to implement complex functions, generally devolved to the controller of the machine. Hence, the integration of said flowmeter with the controller board of a beverage machine is relatively complex, since it is necessary to connect the electronic board of the flowmeter with a cable to the controller of the beverage machine. Consequently, supplementary operations consisting in connecting the electronic board to a connector of the controller board are required and increase the manufacturing costs of the beverage machine.

There is still a need to improve the integration of a flowmeter with the control unit of a fluid circuit, in particular of a beverage preparation machine. In particular, there is a need to improve the integration of flowmeters to reduce the manufacturing costs of devices containing flowmeters.

SUMMARY OF THE INVENTION

The invention thus relates to a flowmeter that comprises: an outermost casing containing a measuring chamber; an outermost face on the casing; a generator for generating at the outermost face a signal representative of a flow through the measuring chamber; and a connection arrangement for fastening the outermost casing against a printed circuit board (hereinafter designated as the "PCB") which extends over and beyond the outermost casing and contains a sensor that is located at the outermost face and that is configured to sense said signal from the generator upon connection. In accordance with the invention, the connection arrangement is configured for connection against such PCB, which connection between this PCB and the casing is distinct from the sensor.

Hence, the flowmeter of the invention can be fastened directly onto a PCB that contains the sensor for sensing the signal representative of the flow through the flowmeter. This configuration simplifies greatly the manufacturing and assembly of the flowmeter since cables between the PCB and the flowmeter are no more necessary. Such an assembly of the flowmeter to PCB can thus be carried out fully automatically, especially since the assembly process may be reduced to an assembly of rigid parts only that do not involve orientation and localisation issues like the assembly of flexible, deformable and/or loose parts, in particular cables.

Moreover, by providing a connection arrangement for fastening the flowmeter to the PCB which does not involve any mechanical contribution of the sensor, the likelihood that the sensor would be damaged or that its connection to the PCB could suffer by mechanical constraints involving the fastening of the flowmeter on the PCB, is largely eliminated. Thus, the connection arrangement that bears the fastening forces of the flowmeter onto the PCB at and upon assembly thereof, is external to the sensor. Hence, the sensor is generally not subjected to any constraints resulting from the connection between the PCB and the flowmeter.

Typically, the connection arrangement is located outside a sensor area for receiving the sensor upon connection. The outermost face of the flowmeter's casing may include a recess for receiving the sensor. By positioning the sensor in a recess in the outermost face, the sensor benefits from a lateral protection.

Moreover, the recess may server as an orientation discriminator at assembly to avoid any wrong assembly of the flowmeter onto the PCB. However, the sensor should be so arranged on the PCB that no attempt of such wrong assembly would damage the sensor.

To properly position the flowmeter on the PCB and avoid any unnecessary pressure of the flowmeter onto the sensor, the casing may comprise at least one spacer for spacing the PCB from the outermost face of the flowmeter's casing. It is of course also possible to provide a recess in the casing's outer face that is deep enough to contain the sensor completely so that the outermost face, around the recess, may be urged or otherwise brought in contact with the PCB.

The connection arrangement may include at least one fastening device, in particular a mechanical fastening device, such as a screw, snap, bayonet connector, rivet, staple, clip, split pin, clevis pin, strap, peg and force-fitting and other fastening devices. The connecting arrangement may have a plurality of fastening members arranged about an inner area of the outermost face. This inner area, which may be or which may include a recess as discussed above, typically faces the sensor upon connection.

The connection arrangement can comprise an adhesive and/or welded seal for joining the flowmeter onto the PCB, optionally via the casing's outermost face in particular via a peripheral part of the outermost face.

The casing can be covered with an insulating layer such as an insulating sheet, optionally made of polyimide (PI), such as Kepton™ produced by DuPont de Nemours®.

The generator of the flowmeter may include a measuring body that is driven, in particular rotationally driven, by a flow trough the chamber. The generator may comprise at least one magnet for emitting the signal representative of the flow as a magnetic signal.

The flowmeter's casing and/or the measuring body can be made of at least one of POM and PBT. For instance, the flowmeter's casing and the measuring body are made of POM, such as Schulaform 9A, and PBT, such as Tecdur GK30, or vice versa.

In so far as the flowmeter is used in a beverage preparation machine, the materials forming the chamber and the rotatable measuring body should be food safe. Furthermore, they should have a low friction coefficient and a low abrasion rate and be well controllable in the manufacturing/moulding process so as to achieve high dimensional precision to provide a high quality flowmeter, in particular highly reliable, at limited cost. Moreover, these materials should be so controllable in the manufacturing process, e.g. moulding, as to permit the formation of small-sized reliable parts in order to be able to reduce the size of the flowmeter as well as of a device in which such a flowmeter is integrated for use. All these requirements are fulfilled by using the abovementioned materials, in particular in combination.

The abrasion rate of the POM material against the PBT material can be of about 0.2 μm/km. The abrasion rate of the PBT material against the POM material is typically of about 0.7 μm/km. Moreover, such POM and PBT materials are food safe. Such an abrasion rate provides a long lifetime for inexpensive moulded flowmeters, e.g. for use in beverage preparation machines.

For instance, the flowmeter's casing and the measuring body may include a stabilising filler, such as fibres or beads, in particular glass beads, such as a stabilising filler representing 10 to 70 vol % of the housing and/or of the measuring body, in particular 15 to 50 vol % such as 20 to 40 vol %. The use of a filler material such as beads and/or fibres leads to an increased control of the shrinkage of the composite material when it consolidates during the moulding step. This is particularly desirable for insuring a high dimensional precision of the relatively movable parts and for a proper assembly of the parts. Moreover, the use of an appropriate filler material provides clean surfaces which can be manufactured with tight tolerances in particular for the bearings. A filler material may also reduce the friction coefficient and abrasion rate. The components produced from such a composite material also exhibit a high stability, in particular for the connecting part, as discussed below. Further details on the use of such materials for the manufacturing of flowmeters are disclosed in EP 09 163 813.0 which is hereby incorporated by reference.

The rotatable measuring body may have a rotatable shaft extending across the measuring chamber, the shaft being rotatably mounted and positioned in the measuring chamber at opposite extremities of the shaft by point bearings. For instance, the shaft is a rotor or like element with flow intercepting parts such as fins or blades, typically an impeller. Each point bearing may be formed of a protruding part and a cooperating facing counter-part part, in particular a recessed part, associated, respectively, with the casing and an extremity of the rotatable shaft, or vice versa. The protruding part and the counter-part are advantageously integrally formed with their associated moulded casing and moulded rotatable shaft.

For instance, the casing comprises facing protrusions extending into the chamber for forming the point bearings. Alternatively, the protrusions may be located on the shaft of the measuring body. It is also possible to provide a mixed configuration, i.e. a first bearing with the protrusion on the shaft and a second (opposite) bearing with the protrusion on the casing.

For instance, the casing is made of two assembled bodies. The rotatable shaft typically has a rotation axis that extends between a point bearing located on the second casing body, e.g. a cover or lid body, and a facing point bearing located on the first casing body, e.g. in a cup-like body of the casing.

The first body may form a reference surface perpendicular to the shaft's rotation axis, the second body having an inner face, that is urged against the reference surface for precisely setting a spacing between these point bearings so as to hold and allow free rotation of the shaft therebetween. This geometric referencing providing a reliable precise spacing between the point bearings is made possible by the use of the bayonet closure system between the first and second bodies.

Thus, the manufacturing costs of such flowmeter that does not require a diamond or like element for forming the bearing, are significantly reduced. The two bearing parts can be formed during a moulding step of the components they are respectively associated with. The bearing parts can be integrally formed with the static support component and with the moving measuring component, respectively, and no separate assembly step is required therefor. This limits significantly the production costs. The accuracy of the flowmeter is however largely independent from the orientation of the flowmeter. The protruding part and/or counter-part of each point bearing can be made by fusion/solidification and/or polymerization of materials, usually by moulding these materials.

Further optional constructional details of such a flowmeter are for example disclosed in EP 09 163 815.5 which is hereby incorporated by way of reference.

The invention also relates to a PCB containing a sensor, such as a hall sensor, and an arrangement distinct from the sensor for fastening adjacent to the sensor an outermost casing of a flowmeter, in particular as described above. Such PCB is configured to extend over and beyond the flowmeter, such sensor being arranged to sense a signal, in particular a magnetic signal, representative of a flow through this flowmeter.

The PCB may have one or more anchorages in particular anchorage holes, such as through-holes, for anchoring one or more corresponding fastening members the flowmeter, in particular a plurality of anchorage around the sensor.

Typically, the sensor is an integrated component or a discrete incorporated component mounted directly onto the PCB.

A further aspect of the invention relates to the above described flowmeter and PCB when fastened together. The sensor may be maintained at a distance or contactless from the casing to avoid any stress on the sensor resulting from the fastening of the flowmeter on the PCB.

Yet another aspect of the invention relates to a beverage preparation machine having a control unit that comprises the above described PCB and/or that is connected to the above described flowmeter, in particular such a flowmeter fastened to such a PCB.

The beverage preparation machine typically has a liquid circulation circuit, in particular a water circulation circuit, that comprises a flowmeter, in particular fastened to a PCB, as described above.

For instance, the machine is a coffee, tea or soup machine, in particular a machine for preparing within an extraction unit a beverage by passing hot or cold water or another liquid through a capsule or pod containing an ingredient of the beverage to be prepared, such as ground coffee or tea or chocolate or cacao or milk powder. The machine may comprise a brewing unit for housing this ingredient. Typically, the machine includes one or more of a pump, heater, drip tray, ingredient collector, liquid tank and fluid connection system for providing a fluid connection between the liquid tank and the brewing unit, etc. . . . The configuration of a fluid circuit between the liquid reservoir and a heater for such a machine is for example disclosed in greater details in WO 2009/074550.

BRIEF DESCRIPTION OF THE DRAWINGS

The invention will now be described with reference to the schematic drawings, wherein FIG. 1 shows an exploded view of a flowmeter and PCB according to the invention.

DETAILED DESCRIPTION

FIG. 1 shows a flowmeter 1 typically for a beverage preparation machine, such as a coffee machine. The flowmeter may be mounted in the fluid circuit of the beverage preparation machine as for example described in greater details in WO 2009/130099.

Flowmeter 1 has an outermost casing formed of two assembled moulded bodies 2,4 delimiting an internal generally cylindrical measuring chamber 10. For example, the casing is formed by injection moulding.

Each of the moulded bodies 2,4 has a through-opening communicating with measuring chamber 10 for circulating liquid through such flowmeter. In particular, a tubular inlet 47 is provided in cup-like body 4 and a tubular outlet 27 is provided in cover body 2. The inlet and the outlet could of course be switched. Moreover, the inlet and the outlet could be located on the same moulded body. These inlet and outlet have a relative position depending on the position of the first and second bodies.

Casing 2,4 contains a rotatable measuring body 3 in the form of a rotor or impeller. Body 3 has a series of radial members 31, e.g. fins or blades, on a rotatable shaft 32 extending centrally across the measuring chamber 10. Shaft 32 has a lower part 33 from which radial members 31 extend and an upper part 34. Two cavities 35 are provided in upper part 34 for casing a pair of magnets 36 of corresponding shape. Shaft 32 or body 3 may be manufactured by injection moulding as well.

Flowmeter 1 has upper and lower point bearings for mounting opposite extremities 32',32" of rotatable shaft 32 in casing bodies 2,4. These point bearings are formed by protrusions of casing 2,4 extending into chamber 10 and by recesses in extremities 32',32" of rotatable shaft 32 forming a positioning counter-part for the protrusion, a lower protrusion in the form of a pin 11 and an upper recess 37 of this type forming part of the lower and upper bearings can be seen in FIG. 1. The lower and upper bearings are identical to ensure similar performance in all possible orientations.

Protrusions 11 and counter-parts 37 are integrally formed with the moulded casing bodies 2,4 and the rotatable shaft 32, respectively. In other words no additional component is needed for forming the bearing parts of the flowmeter. These may be moulded directly with the respective components, i.e. casing bodies 2,4 and shaft 32. The shaft or even the entire impeller 3 (except magnets 36) can be made of POM; casing 2,4 can be made of PBT with 30 vol % glass beads and/or fibers as a filler material.

As illustrated in FIG. 1, lower casing body 4 is in the general shape of a cup and upper casing body 2 is in the general shape of a cover or lid. It is understood that the "lower" and "upper" references merely refer to the particular orientation of flowmeter 1 as illustrated in FIG. 1. During use, flowmeter 1 may take any orientation or even change orientation.

Rotatable shaft 32 has a rotation axis 3' that extends between a point bearing (not shown) located at cover body 2 and a facing point bearing 11 located in cup-like body 4.

The rotation of a measuring body 3 by the flow through chamber 10 drives magnets 36 around axis 3'. The rotating magnetic field generated by the rotation of magnets 36 forms a signal representative of this flow through the adjacent cover body 2 of the flowmeter's casing to an outermost face 20 thereof.

Cup-like body 4 has a rim 41 forming a reference surface 42 perpendicular to rotation axis, cover body 2 having an inner face 22 that is urged on reference surface 42 for precisely setting a spacing between the point bearings 11 so as to hold and allow free rotation of shaft 32 therebetween. Inner face 22 and reference surface 42 form a contact portion 22,42 of the bayonet connector.

Furthermore, rim 41 has an upright inner surface 43 cooperating with a corresponding seal lip 23 of cover body 2 for sealing cover body 2 on cup body 4 by force-fitting of lip 23 into rim 41. This assembly and possible variations are shown in greater details in the abovementioned EP 09 163 815.5 and EP 09 163 813.0.

Cup-like body 4 has four spaced apart hooks 45,45a that are generally evenly distributed on rim 41 and contact portion 22,42 and that cooperate with corresponding passages 25,25a and hook retaining parts 26 at the periphery of cover body 2 to form a bayonet connection.

Hooks 45,45a and hook-retainers 26 with associated hook-passages 25,25a form the pairs of interconnecting securing parts of the bayonet connector for assembling the casing's bodies 2,4. Hooks 45,45a are arranged to pass their corresponding hook-passage 25,25a and then engage with their hook-retainer 26 at assembly. Hooks 45,45a and hook-retainers 26 are in a resilient respective relationship so as to permit and secure the connection. The interconnecting securing parts can be configured to allow non-destructive disassembly. Alternatively, they may be configured so that a disassembly possibility is not provided and would normally lead to destruction of the bayonet connection and/or at least one casing portion.

As the locking movement at bayonet connector of cover body 2 on cup body 4 is in a plane perpendicular to shaft 32 and rotational axis 3', the spacing between the point bearings is not affected by this locking. This spacing is entirely determined by the geometry (and position) of contact portion 22,42 relatively to the location of the point bearings so that tight tolerances for the bearings can be provided even though they are formed by moulding and not by additional diamonds. Hooks 45,45a, hook-passages 25,25a as well as hook-retainers 26 are integrally formed with casing bodies 2,4.

The pairs of interconnecting securing parts, e.g. hooks 45,45a and hook-retainers 25,25a, are arranged so that the casing bodies 2,4 are assemblable in only one position in the embodiment shown in FIG. 1. Such a configuration prevents any erroneous assembly of flowmeter 1 that would not be compatible with a connection of the flowmeter onto PCB 50.

For instance, the interconnecting securing parts of each pair have cooperating shapes for interconnection thereof, the pairs of securing parts having at least two different kinds of cooperating shapes formed so that a securing part of a pair of a first kind is incompatible with a corresponding securing part of another kind.

In a variation, it is of course possible to have a symmetric arrangement of the interconnecting securing parts to allow any number of orientations of the assembly of the casing bodies.

In the particular embodiment of FIG. 1, a pair of interconnecting securing parts of a first type of first dimensions has a hook 45 interconnectable via a hook-passage 25 with a hook-retainer 26. A pair of interconnecting securing parts of a second type of second dimensions has a hook 45a interconnectable via a hook-passage 25a with a hook-retainer 26. Hook 45a of the second type is incompatible with hook-passage 25 and/or hook-retainer 26 of the first type. For example, hook 45a of the second type is too large to pass via hook-passage 25 of the first type to reach retainer 26.

Hook 45a of second type is generally similar to hook 45 of the first type. However, hook 45a of the second type has a greater length than hook 45 of the first type, measured along rim 41 or contact portion 22,42. The increased length results from the longer base of hook 45a due to the presence of a hump 45b. Peripheral passage 25 is long enough to let hook 45 pass. However, passage 25 is to short to let hook 45a with hump 45b pass. Hook 45a with hump 45b may only pass via its dedicated passage 25a that has a length which is increased compared to passage 25 and adapted to the dimensions of hook 45a with hump 45b.

It follows that the only assembly position accepted by body 2 against body 4 is the position resulting from the passage of hook 45a with hump 45b through passage 25a. No other assembly position is possible with the bayonet configuration shown in FIG. 1.

In another variation it is of course possible to have two kinds of pairs of interconnecting securing parts in which the dimensional differences reside concern the hook-retainer with corresponding differences at the level of the hook and/or a retainer-passage.

In a further variation, it is possible to provide facing identical pairs of interconnecting securing parts distributed so as to allow a number of assembly configurations that is equal to half the number of pairs of interconnecting securing members.

For example, the embodiment shown in FIG. 1 can be modified by replacing hook 45 facing hook 45a across body 4 by a hook 45a with hump 45b and provide a corresponding substitution of passages 25 and 25a in body 2. With such a configuration, bodies 2 and 4 accept two assembly positions, namely a first configuration with inlet 47 and outlet 27 on the same side of flowmeter 1 and a second configuration with inlet 47 and outlet 27 on opposite sides of flowmeter 1, and no further assembly configuration, despite the presence of four pairs of hooks and retainers.

Furthermore, flowmeter 1 is arranged to cooperate with control unit 5, typically a control unit of a beverage preparation machine.

Control unit 5 has a PCB 50 including a sensor 51. Sensor 51 can be a discrete component that is welded or mechanically and electrically assembled directly onto the surface of PCB 50. Alternatively, the sensor may be directly integrated into the PCB. Hence, sensor 51 is not remotely located relative to PCB 50 and does not need any flexible wires or cables for its connection.

Furthermore, flowmeter 1 has a connection arrangement 28 for fastening outermost casing 2,4 against PCB 50. This PCB extends over and beyond casing 2,4. Upon fastening of flowmeter 1 on PCB 50, sensor 51 is located adjacent outermost face 20 and is configured to sense the magnetic signal generated by magnets 36 rotating with rotatable body 3 under the effect of a flow through chamber 10.

In accordance with the invention, connection arrangement 28 is configured for connection of flowmeter 1 against casing 2,4, which connection between the PCB and the casing is distinct from sensor 51. In particular, connection arrangement 28 is located outside a sensor area 29 for receiving sensor 51 upon connection. This sensor area is formed by a recess 29 in outermost face 20. Hence, upon assembly of flowmeter 1 onto PCB 50, sensor 51 is directly exposed to the magnetic filed generated by magnets 36 rotating with measuring body 3 with a flow of e.g. liquid through measuring chamber 10. To detect variations of the amplitude of the magnetic field adjacent to outermost face 20, sensor 51 may be of the Hall type.

Casing cover 2 further comprises a spacer 28' for spacing outermost face 20 from PCB 50. Upon assembly of flowmeter 1 on PCB 50, spacer 28' rests against PCB. Thereby, a sufficient spacing can provided at all time between outermost face 20 with recess 29 and PCB 50 to prevent that sensor 51 located therebetween gets squeezed and subject to unnecessary constraints. Hence, sensor 51 is maintained at a distance or contactless from the flowmeter's casing 2,4.

The connection arrangement includes a pair of semi-rigid resilient members 28 extending upright from outermost face 20. Members 28 are suitable to be fastened to PCB 50 via corresponding through-openings 58 forming anchorage holes for members 28. Members 28 are arranged about an inner area 29 of the outermost face 20. This inner area faces sensor 51 upon connection.

PCB 50 has peripheral cut-outs 59 and a resiliently deformable intermediate member 59' against which spacer 28' of flowmeter 1 is urged to ensure looseness free assembly of flowmeter 1 against PCB 50. Thereby, the accuracy of the measured flow via flowmeter 1 is maintained over time.

In a variation, it is possible to use an adhesive material to secure flowmeter 1 against PCB 5 or to weld flowmeter thereagainst, e.g. via spacer 28'.

Casing 2,4 is covered with an insulating layer 52 of Polyimide in the vicinity of sensor 51. Layer 52 may be pre-applied onto outermost face 20 or over sensor 51, in particular using an adhesive bonding material.

During use of flowmeter 1, liquid is circulated from inlet 47 to outlet 27 via chamber 10. The flow of liquid will be intercepted by blades 31 thus driving shaft 32 in rotation about axis 3' between the point bearings at extremities 32',32" of shaft 32. The speed of rotation of shaft 32 will be proportional to the flow of liquid in chamber 10 and driving measuring body 3. By rotating shaft 32, magnets 36 are rotated adjacent to the Hall sensor 51 on PCB 50 and located in recess 29 of the flowmeter's outermost face 20. The Hall sensor will detect the rotating magnetic field generated by the magnets and convert it into a corresponding electric signal having a frequency corresponding to the speed of rotation of shaft 32.

The invention claimed is:

1. A flowmeter comprising:
   an outermost casing containing a measuring chamber;
   an outermost face on the outermost casing;
   a generator for generating at the outermost face a signal representative of a flow through the measuring chamber; and
   a connection arrangement for fastening the outermost casing against a PCB which extends over and beyond the outermost casing and contains a sensor that is located at the outermost face and that can sense the signal from the generator upon connection, the PCB being a controller board of a beverage preparation machine, which is configured to instruct components of the beverage preparation machine to prepare a beverage; and
   the connection arrangement is configured for creating a connection against the PCB, that is distinct from the sensor.

2. The flowmeter of claim 1, wherein the connection arrangement is located outside a sensor area for receiving the sensor upon connection.

3. The flowmeter of claim 1, wherein the outermost face comprises a recess for receiving the sensor.

4. The flowmeter of claim 1, wherein the outermost casing comprises at least one spacer for spacing the PCB from the outermost face.

5. The flowmeter of claim 1, wherein the connection arrangement comprises at least one fastening device.

6. The flowmeter of claim 5, wherein the connection arrangement comprises a plurality of fastening devices arranged about an inner area of the outermost face.

7. The flowmeter of claim 6, wherein the inner area of the outermost face faces the sensor upon connection.

8. The flowmeter of claim 1, wherein the connection arrangement comprises an adhesive and/or welded seal.

9. The flowmeter of claim 1, wherein the outermost casing is covered with an insulating layer.

10. The flowmeter of claim 1, wherein the generator comprises a measuring body that is driven by a flow in the chamber and that comprises at least one magnet for emitting a magnetic signal.

11. The flowmeter of claim 1, wherein the outermost casing is covered with an insulating layer made of polyimide.

12. The flowmeter of claim 1, wherein the sensor is located a distance from the outermost casing such that the sensor does not touch the outermost casing.

13. The flowmeter of claim 1, wherein the outermost face of the outermost casing comprises a spacing member and the PCB comprises peripheral cut-outs and a resiliently deformable intermediate member against which the spacer is urged.

14. A PCB containing a sensor and an arrangement distinct from the sensor for fastening adjacent to the sensor an outermost casing of a flowmeter, the PCB being a controller board of a beverage preparation machine and comprising one or more anchors for anchoring one or more corresponding fastening members of the flowmeter around the sensor, and being configured (i) to extend over and beyond the flowmeter, such that the sensor is arranged to sense a signal representative of a flow through the flowmeter, and (ii) to instruct components of the beverage preparation machine to prepare a beverage.

15. The PCB of claim 14, wherein the sensor is an integrated component.

16. The PCB of claim 14, wherein the sensor is maintained at a distance from the outermost casing.

17. The PCB of claim 14, wherein the sensor is a discrete incorporated component mounted onto the PCB.

18. A beverage preparation machine having a control unit that comprises a PCB that is a controller board and contains a sensor and an arrangement distinct from the sensor for fastening adjacent to the sensor an outermost casing of a flowmeter, the PCB being configured (i) to extend over and beyond the flowmeter, such that the sensor is arranged to sense a signal representative of a flow through the flowmeter, and (ii) to instruct components of the beverage preparation machine to prepare a beverage.

19. The flowmeter of claim 1, wherein the connection arrangement comprises at least one fastening device selected from the group consisting of a screw, snap, bayonet connector, rivet, staple, clip, split pin, clevis pin, strap, peg and force-fitting.

* * * * *